United States Patent
Woo et al.

(10) Patent No.: US 6,540,177 B2
(45) Date of Patent: Apr. 1, 2003

(54) FLYING OBJECT BY FLAPPING MOTION OF WINGS EQUIPPED WITH COMPRESSED AIR ENGINE

(75) Inventors: Jong Bok Woo, Gangwon-do (KR); Ja Kook Koo, Chungjoo-shi (KR); Kwang Joon Yoon, Seoul (KR); Yun Je Kim, Seoul (KR)

(73) Assignee: Aerodavinci Co., Ltd. (KR)

(*) Notice: Subject to any disclaimer, the term of this patent is extended or adjusted under 35 U.S.C. 154(b) by 0 days.

(21) Appl. No.: 10/129,462
(22) PCT Filed: Jun. 1, 2001
(86) PCT No.: PCT/KR01/00932
§ 371 (c)(1),
(2), (4) Date: Jul. 28, 2000
(87) PCT Pub. No.: WO02/10014
PCT Pub. Date: Feb. 7, 2002

(65) Prior Publication Data
US 2003/0029964 A1 Feb. 13, 2003

(30) Foreign Application Priority Data
Jul. 28, 2000 (KR) .......................................... 2000-43618

(51) Int. Cl.$^7$ ............................................... B64C 33/00
(52) U.S. Cl. .......................... 244/11; 244/22; 244/28; 244/72; 446/35
(58) Field of Search .............................. 244/11, 22, 28, 244/72; 446/35

(56) References Cited

U.S. PATENT DOCUMENTS

| | | | | |
|---|---|---|---|---|
| 3,161,376 A | * | 12/1964 | Lyle | 244/20 |
| 3,728,814 A | * | 4/1973 | Ruston | 446/35 |
| 4,053,122 A | | 10/1977 | Gar | 244/11 |
| 4,749,149 A | | 6/1988 | Gruich | 244/22 |
| 5,149,020 A | | 9/1992 | Rundle et al. | 244/253 |
| 5,163,861 A | * | 11/1992 | Van Ruymbeke | 446/35 |
| 6,006,517 A | * | 12/1999 | Kownacki et al. | 60/370 |

FOREIGN PATENT DOCUMENTS

KR     1990-8330     5/1990

* cited by examiner

Primary Examiner—J. Woodrow Eldred
(74) Attorney, Agent, or Firm—Woodcock Washburn LLP

(57) ABSTRACT

The present invention to a flying object by flapping motion of two pair of wings, which comprises a compressed air engine, a flying body (or compressed air container) assembled with the compressed air engine and in which compressed air is contained, two pair of wings symmetrically assembled with the compressed air engine and functioning flapping motion up and dawn in the range of 70° while the individual wing being able to get twisted in the range of 15°, a head cover for covering the front and upper part of the compressed air engine, and a tail wing with a horizontal wing and a vertical wing.

18 Claims, 12 Drawing Sheets

(A)

(B)

(C)

(A)

(B)

FLYING OBJECT BY FLAPPING MOTION OF WINGS EQUIPPED WITH COMPRESSED AIR ENGINE

FIELD OF THE INVENTION

The present invention relates to a flying object in which compressed air is filled into a flying body, and a flying is realized by the discharging force of the compressed air. More specifically, the present invention relates to a flying object in which compressed air is filled into a flying body, and the compressed air is discharged at a certain discharge rate to drive a compressed air engine so as to make two pairs of wings flapped, thereby producing a lifting force and a propulsive force, and making the flying object fly.

BACKGROUND OF THE INVENTION

Model planes are a kind of most popular sports articles for adults as well as for children. So far, many kinds of model planes have been manufactured for being used as toys, as sports articles and as recreation articles. The model planes that have been manufactured so far can be classified into: those having no power-driving means; and those having a power-driving means. The model planes that are provided with the power-driving means include: propeller planes, jet planes, and helicopters with helical wings. They are usually controlled with a radio controller.

The present inventors have been making efforts to get rid of the conception of the conventional model planes to develop a flying object resorting to the flapping motions of wings like birds and insects.

OBJECT OF THE INVENTION

Therefore it is an object of the present invention to provide a flying object in which the flying body that functions a compressed air container is filled with a compressed air, and the compressed air thus filled is discharged at a certain discharge rate, thereby producing a propulsive force for the flying object.

It is another object of the present invention to provide a flying object in which the compressed air is discharged at a certain discharge rate, so that a compressed air engine can produce flapping motions in the wings, thereby making the flying object fly.

It is still another object of the present invention to provide a flying object in which the flying body (the compressed air container), the two pairs of wings and a head cover can be assembled to the compressed air engine in a simple manner, so that the flying object can be conveniently used.

It is still another object of the present invention to provide a flying object in which a portable pump is used to inject the compressed air into the flying body so as to realize a flying.

It is still another object of the present invention to provide a flying object in which two pairs of wings perform flapping motions up and down to produce a propulsive force so as to realize a flying.

It is still another object of the present invention to provide a flying object in which the two pairs of wings perform the flapping motions in opposite directions, and the individual wings perform twisting motions within a range of 15° so as to realize the flying.

It is still another object of the present invention to provide a flying object in which a vertical tail wing of the flying body can be in position adjusted to shift the flying to the desired direction.

The above objects and other objects can be achieved in all by the present invention as described in detail below.

SUMMARY OF THE INVENTION

In achieving the above objects, the flying object according to the present invention includes: a compressed air engine; a flying body assembled to the compressed air engine, for receiving a compressed air; two pairs of wings symmetrically assembled to left and right sides of the compressed air engine, for performing flapping motions up and down within an angular range of about 70° and twisting motions within a range of 15°; a head cover for covering a front part and an upper part of the compressed air engine; and a tail wing.

The tail wing is assembled to a tail part of the flying body, and the vertical tail wing can be in position adjusted to shift the flying direction.

In the flying object of the present invention, air is compressedly injected into the flying body (compressed air container) to a certain level of pressure by using a portable pump; any one of the wings is hit to discharge the compressed air from the compressed air container at a certain discharge, rate; the discharged air drives the compressed air engine; and thus the two pairs of wings assembled to the compressed air engine are made to perform flapping motions in mutually opposite directions up and down and to produce a lifting force and a propulsive force so as to realize a flying.

BRIEF DESCRIPTION OF THE DRAWINGS

The above objects and other advantages of the present invention will become more apparent by describing in detail the preferred embodiment of the present invention reference to the attached drawings in which:

FIG. 11 is a schematic exploded perspective view showing a state in which a front wing 3a is sated from the pin 412a of the reciprocating member 401a;

FIG. 12 is a schematic exploded perspective view of the front wing 3a;

FIG. 14 is a schematic exploded perspective view of the rear wing 4a;

FIG. 15A is a schematic plan view of a frame 42 of the rear wing 4a, and FIG. 15B is a schematic plan view of a wing cloth 725 of the rear wing 4a;

BEST EMBODIMENT OF CARRYING OUT THE INVENTION

Figure 1:
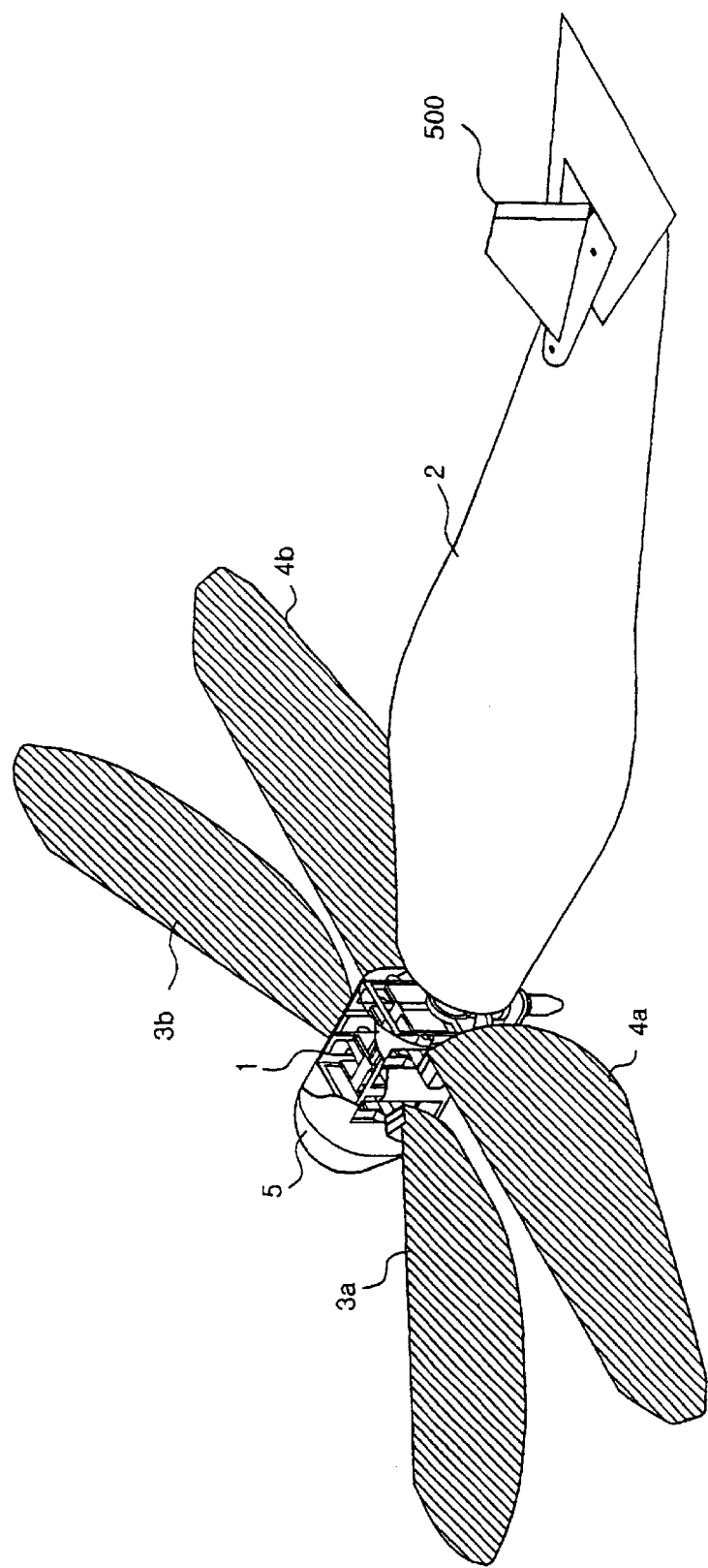
FIG. 1 is a schematic perspective view of the dragon-fly-shaped flying object equipped with the compressed air engine according to the present invention.

The flying object according to the present invention is constituted as follows. That is, a flying body (compressed air container) 2, a pair of front wings 3a and 3b and a pair of rear wings 4a and 4b are assembled to a compressed air engine 1. The compressed air that has been filled in the compressed air container is discharged to drive the compressed air engine. The compressed air engine makes the front and rear wings perform flapping motions up and down in opposite directions within an angular range of about 70°, thereby producing the lifting and propulsive forces, and realizing a fly.

A head cover 5 is not directly related to the function of the flying object of the present invention, but is provided for an aesthetic purpose. The head cover covers the front and upper parts of the compressed air engine 1. FIG. I is a schematic perspective view of the dragon-fly-shaped flying object equipped with the compressed air engine according to the present invention. The flying object according to the present invention can be exploded into: the compressed air engine 1, the flying body 2, the two pairs of wings 3a, 3b, 4a and 4b, the head cover 5 and a tail wing 500. Further, these components can be assembled by a user in a simple manner.

Figure 2:
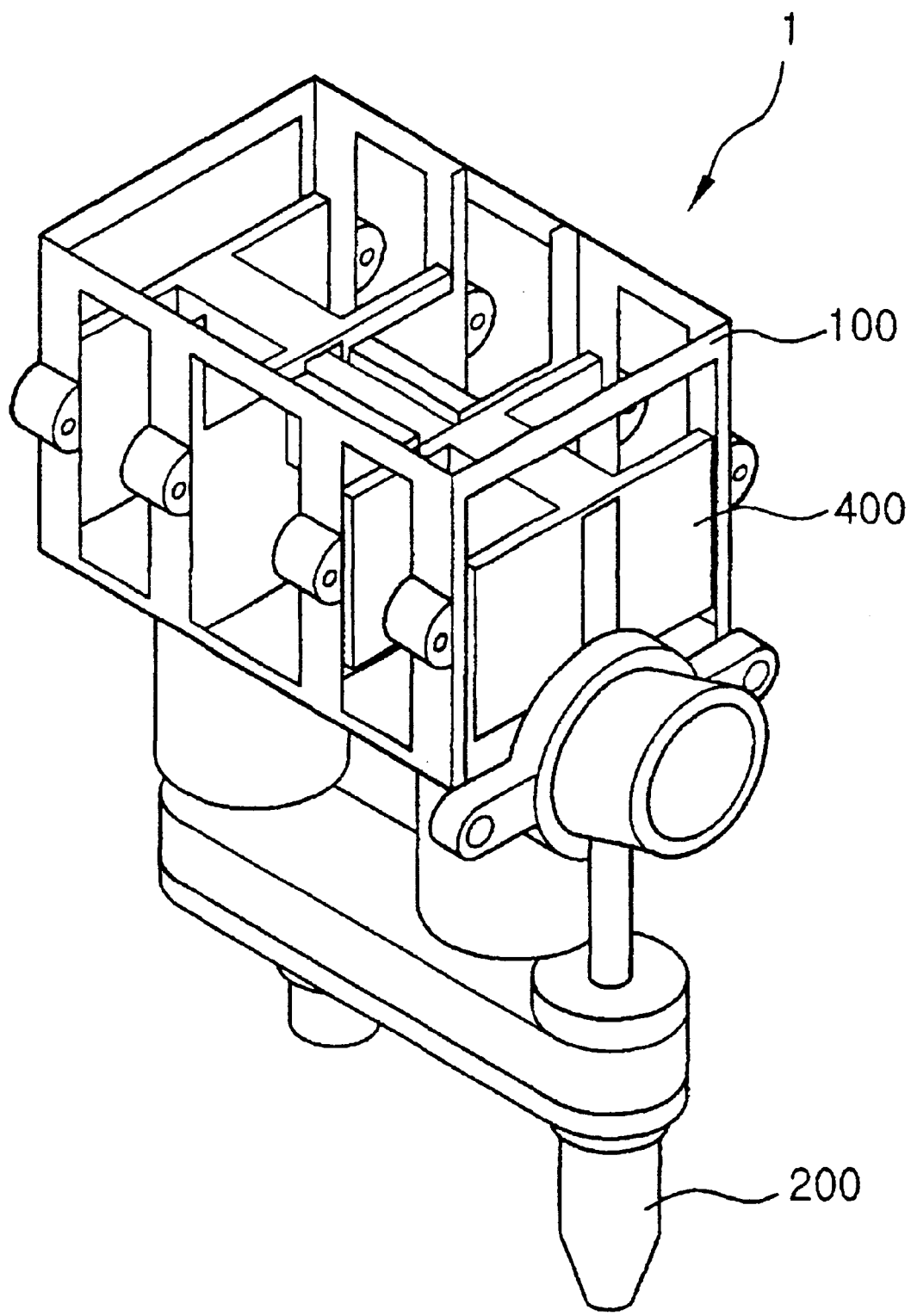
FIG. 2 is a schematic perspective view of the compressed air engine 1 according to the present invention.
Figure 3:
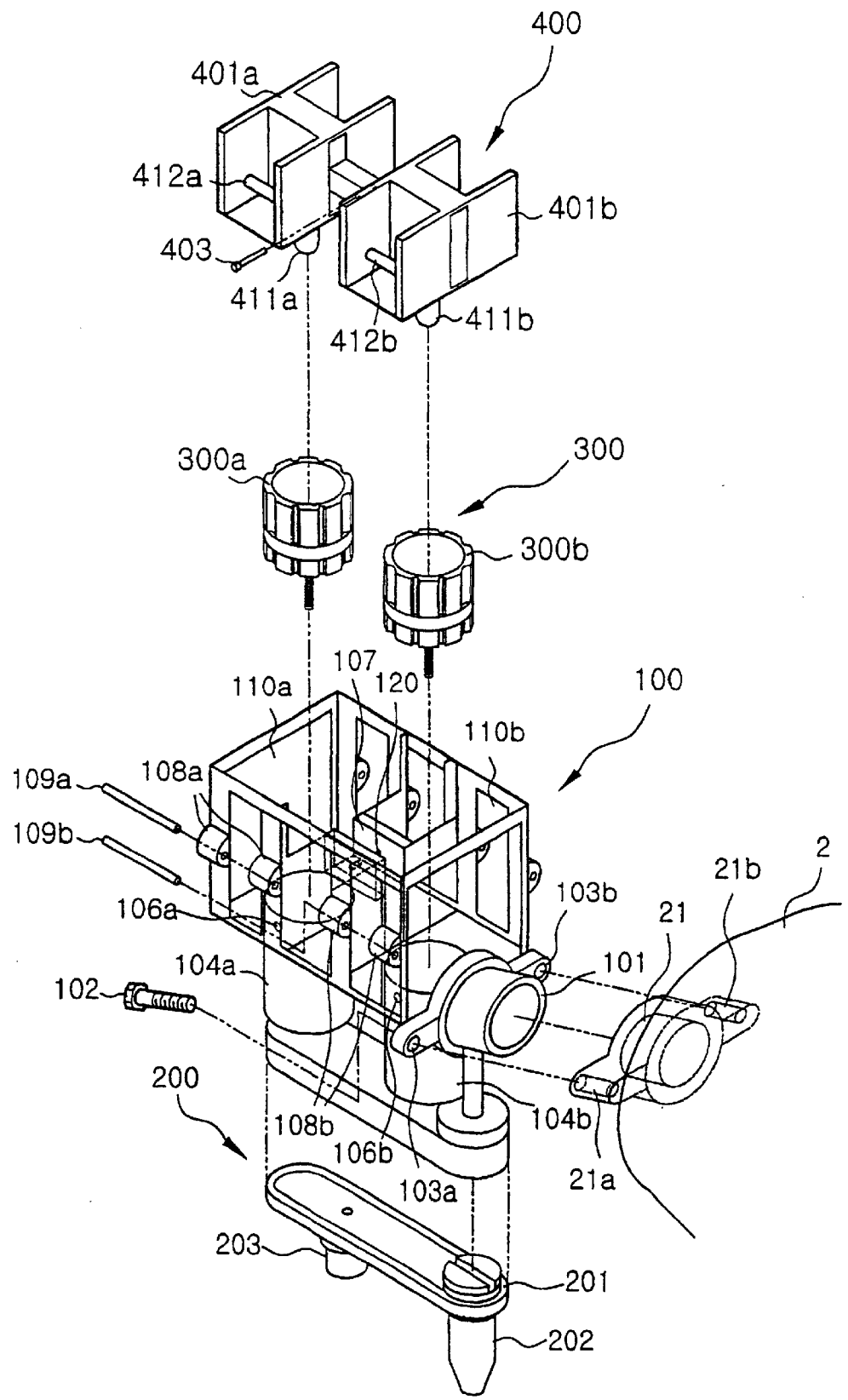
FIG. 3 is a schematic exploded perspective view of the compressed air engine of FIG. 2.

FIG. 2 is a schematic perspective view of the compressed air engine according to the present invention. FIG. 3 is a schematic exploded perspective view of the compressed air engine of FIG. 2. The flying body 2, the two pairs of wings 3a, 3b, 4a and 4b and the head cover 5 are assembled to the compressed air engine.

As shown in FIG. 3, the compressed air engine includes: an engine body 100; an air injection part 200 assembled to the bottom of the engine body 100, for injecting a compressed air; a set of pistons 300 inserted into cylinders of the engine body, for performing up/down movements; and a flapping motion part 400 for performing up/down movements to make the wings 3 and 4 perform flapping motions.

Figure 4:
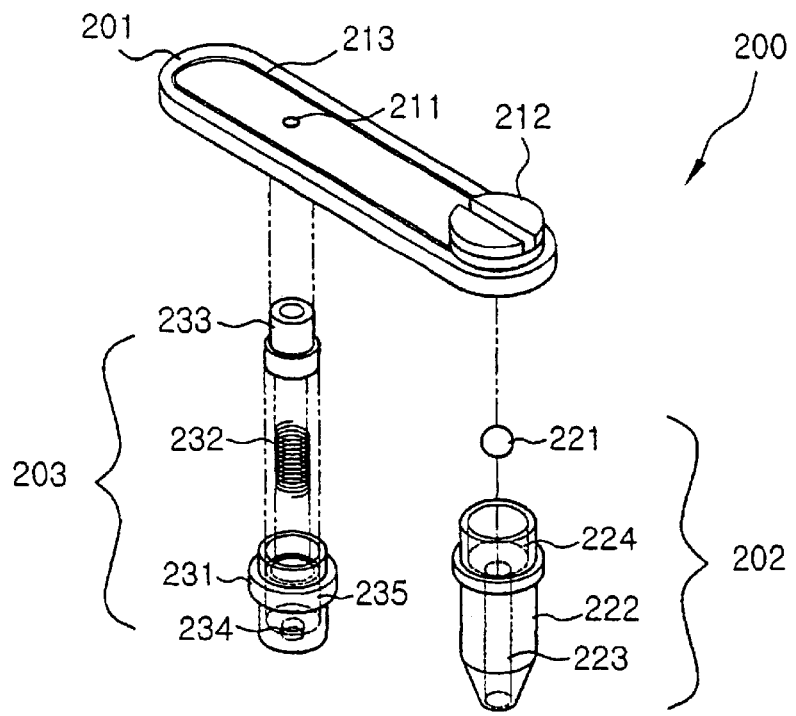
FIG. 4 is a schematic exploded perspective view of an air injection part 200.
Figure 5:
FIG. 5A is a plan view of an air injection part body 201.
FIG. 5B is a bottom view of it.
FIG. 5C is a frontal view of it.
Figure 5:
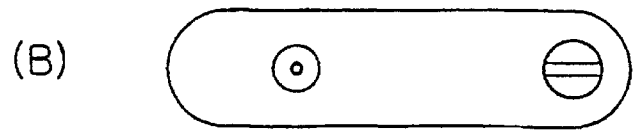
Figure 5:

FIG. 4 is a schematic exploded perspective view of the air injection part 200. The air injection part includes: an air injection part body 201, an air injection means 202, and an air exit means 203. FIG. 5A is a plan view of an air injection part body 201, FIG. 5B is a bottom view of it, and FIG. 5C is a frontal view of it.

The air injection part body 201 is assembled with the air injection means 202 and the air exit means 203. The air injection means 202 includes: a pump connector 222 with an air passage 223 and a dent 224 formed therein; and a rubber bead 221 disposed at the dent 224. A hose (not illustrated) of an air pump (not illustrated) is connected to the pump connector 222, so that the compressed air can be injected into the compressed air container.

When the compressed air is injected through the air injection means 202 into the compressed air container, if the internal pressure of the container exceeds a certain level, then the compressed air is discharged through the air exit means 203. The air exit means serves as a kind of safety pin. As shown in FIG. 4, the air exit means 203 includes: an air cock 231 with an air passage 234 and the dent 235 formed therein; a spring 232 inserted into the dent 235; and a rubber button 233 for pressing the spring 232.

Figure 6:
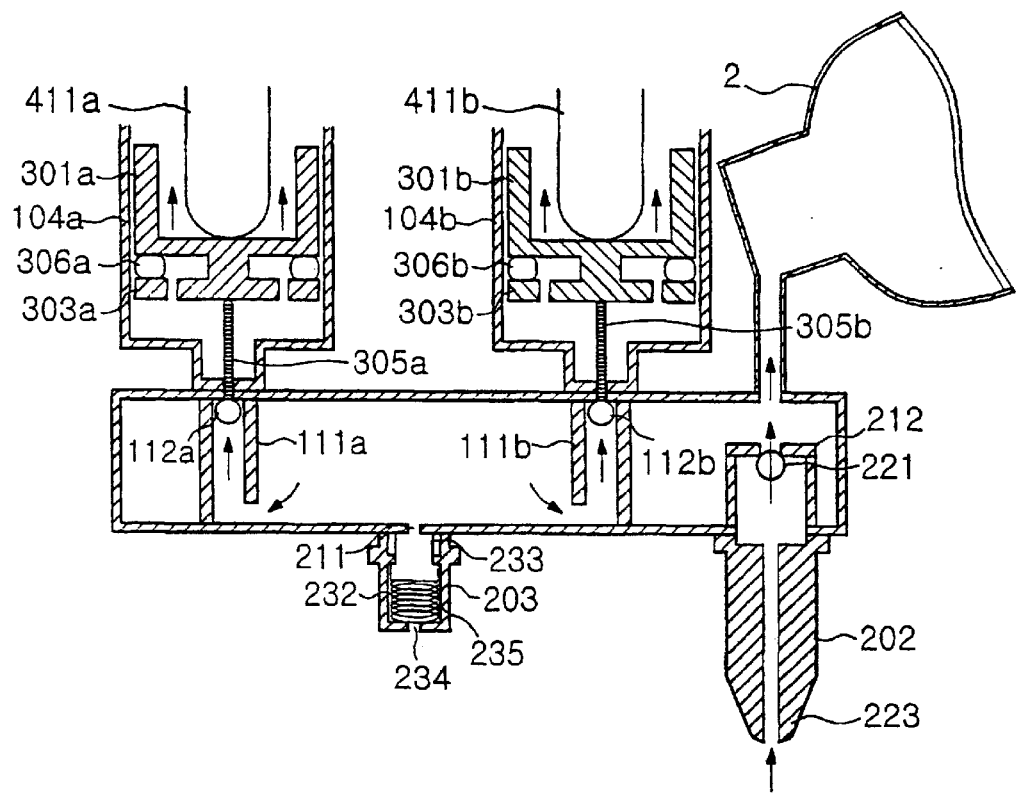
FIG. 6 is a schematic sectional view showing the principle by which the compressed air is injected into the compressed air container 2, and the pistons 300 of the compressed air engine 1 are driven by the compressed air.

FIG. 6 is a schematic sectional view showing the principle by which the compressed air is injected into the compressed air container 2, and the pistons 300 of the compressed air engine 1 are driven by the compressed air.

First, the air that has been compressed by the air pump passes through the air passage 223 to lift the rubber bead 221. Above the rubber bead 221, there is formed a protrusion 212 in which a slit is formed. Therefore, the compressed air can pass through, but the rubber bead cannot pass through. Accordingly, the compressed air is filled into the compressed air container. Thereafter, if the operation of the air pump is halted, then the rubber bead 221 blocks the air passage 223, with the result that the compressed air is not discharged to the outside.

In the case of the present invention, the internal pressure of the compressed air is maintained at about 7 kgf/cm². However, the internal pressure is not limited to this pressure level. If the air pump is activated to inject the compressed air into the compressed air container, then rubber beads 112a and 112b of bead supports 111a and 111b move up to block the air passages, so that the compressed air cannot be discharged. Thus by continuously driving the air pump, the compressed air container can be filled with the compressed air.

If the internal pressure of the compressed air container exceeds a certain level after continuously driving the air pump, then the compressed air container can be ruptured, and therefore, a safety device is required. This safety device is the air exit means 203 that is installed in the air injection part 200. The air exit means is activated only when the internal pressure of the compressed air container exceeds a certain level. In order to make the compressed air discharged, there is provided a hole 211 at the center of the air injection part body 201.

The compressed air that is tending to be discharged through the hole 211 pushes the button 233, and the button in turn pushes the spring 232, with the result that the compressed air is discharged through the dent 235 and the air passage 234 to the outside. If the compressed air is discharged to a certain degree, the button is restored to the original position owing to the elasticity of the spring, with the result that the discharge of the compressed air is stopped.

In the actual case, if the air exit means 203 is activated after excessively filling the compressed air, then the compressed air has to be slightly refilled before carrying out the flying. This can be easily carried out if one has tried the flying object several times.

The compressed air container is made of a synthetic resin, and the resin is not limited to a particular one, but preferably, polyester may be used. The inlet 21 of the compressed air container (flying body) is inserted into an outlet 101 of the engine body 100, and then, bolts 102 are fastened into bolt holes 103a, 21a, 103b and 21b. As shown in FIG. 3, the outlet is slightly inclined up from the horizontal plane of the engine body.

Accordingly, the compressed air container is assembled to the engine body in a slightly upwardly inclined form. The compressed air container should be preferably assembled to the engine body at an inclination angle of about 12 degrees.

As to the bulk of the compressed air container, it depends on the size of the engine and the size of the wings 3 and 4, but usually, if the volume is 300 ml, the flying object can fly about 20 seconds, while the flying distance is 80~100 m.

If the compressed air is sufficiently filled in the compressed air container, then the compressed air engine is activated. The activation of the engine can be carried out in a simple manner. That is, in order to activate the engine, any one of the wings 3a, 3b, 4a and 4b has only to be hit upward or downward.

For example, if any one of the front wings 3a and 3b is lightly hit with hand, then the reciprocating member 401a descends to make the piston 301a descend. Then the spring 305a of the piston momentarily pushes down the rubber bead 112a, so that the compressed air can be discharged. The discharged compressed air pushes up the piston 301a, and the piston pushes up the reciprocating member. Thus if the reciprocating member is lifted up, then the front wings 3a and 3b performs flapping motions.

If the reciprocating member 401a ascends, then the reciprocating member 401b descends, and the piston 301b also descends. Then the spring 305b pushes down the rubber bead 112b, with the result that the compressed air is discharged. These motions are momentarily and repeatedly carried out, so that the pistons 301a and 301b would move up and down in the opposite directions. Meanwhile, the rubber beads 112a and 112b are opened in a mutually opposite manner, and the reciprocating members 401a and 401b move up and down in the mutually opposite directions.

As a result, the two pairs of the wines 3a, 3b, 4a and 4b, which are respectively assembled to the reciprocating members 401a and 401b, perform the flapping motions. That is, if the pair of the front wings 3a and 3b perform the flapping motion upward, the pair of the rear wings 4a and 4b perform the flapping motion downward. These flapping motions are done until the compressed air is completely discharged.

Figure 7:
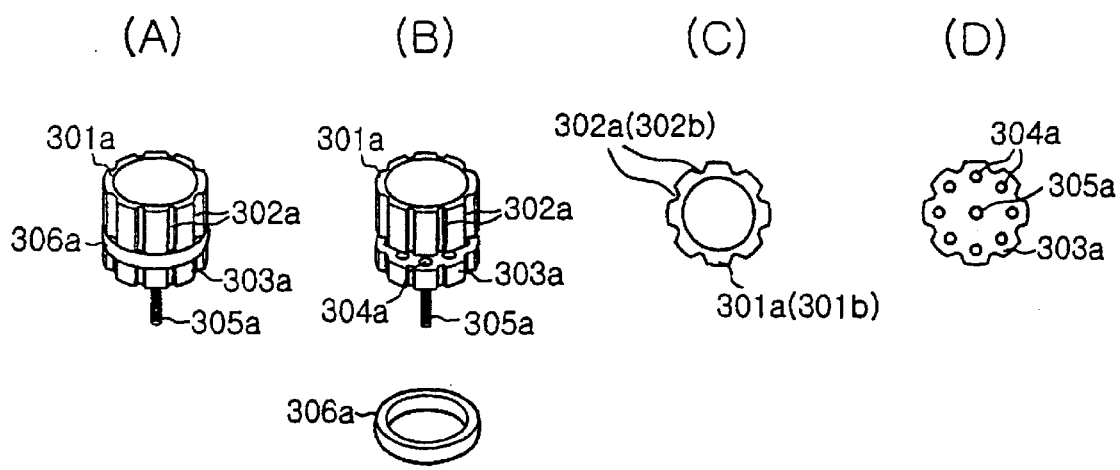
FIG. 7A is a schematic perspective view of the piston 301a, FIG. 7B is an exploded perspective view of the piston with a rubber ring 306a separated off.
FIG. 7C is a plan view of it.
FIG. 7D is a bottom view of it.

FIG. 7 is for clearly showing the up/down movements of the piston 301a. FIG. 7A is a schematic perspective view of the piston 301a, FIG. 7B is an exploded perspective view of the piston with a rubber ring 306a separated off, FIG. 7C is a plan view of it, and FIG. 7D is a bottom view of it;

As shown in FIG. 7, the piston 300 includes: a piston body 301; a disc 303 formed integrally with the piston body; a rubber ring 306 fitted between the piston body and the disc; and a spring 305 assembled to the bottom of the disc. A plurality of axially directed grooves 302 are formed on the piston body and on the disc, and these grooves serve as air passages. Further, the disc is provided with a plurality of holes 304 for serving as air passages.

During the time when the compressed air engine is in activation, the spring 305a repeatedly pushes down the rubber bead 112a. If the rubber bead 112a is pushed down, the compressed air is discharged to pass through the plurality of the holes 304a of the disc 303a. The compressed air which has passed through the holes 304a pushes the rubber ring 306a to make the rubber ring 306a closely contacted to the inside wall of the cylinder 104a. Thus the compressed air pushes up the piston 301a, and in turn, the piston 301a pushes up the reciprocating member 401a.

If the reciprocating member 401a ascends and the reciprocating member 401b descends, then the spring 305b pushes the rubber bead 112b, with the result that the compressed air is discharged through the bead support 111b. At the same time, the rubber bead 112a moves up to the ceiling of the bead support 111a owing to the pressure of the compressed air, thereby blocking the discharge of the compressed air.

If the rubber bead 112a blocks the discharge of the compressed air, then the compressed air is discharged through the air outlet 106a of the cylinder to the outside, and therefore, the rubber ring 306a is contracted. Meanwhile the compressed air that has been filled within the cylinder 104a is discharged through the plurality of the grooves 302a to the outside. These actuations occur in the opposite directions in the piston 300a and the piston 300b.

Figure 8:
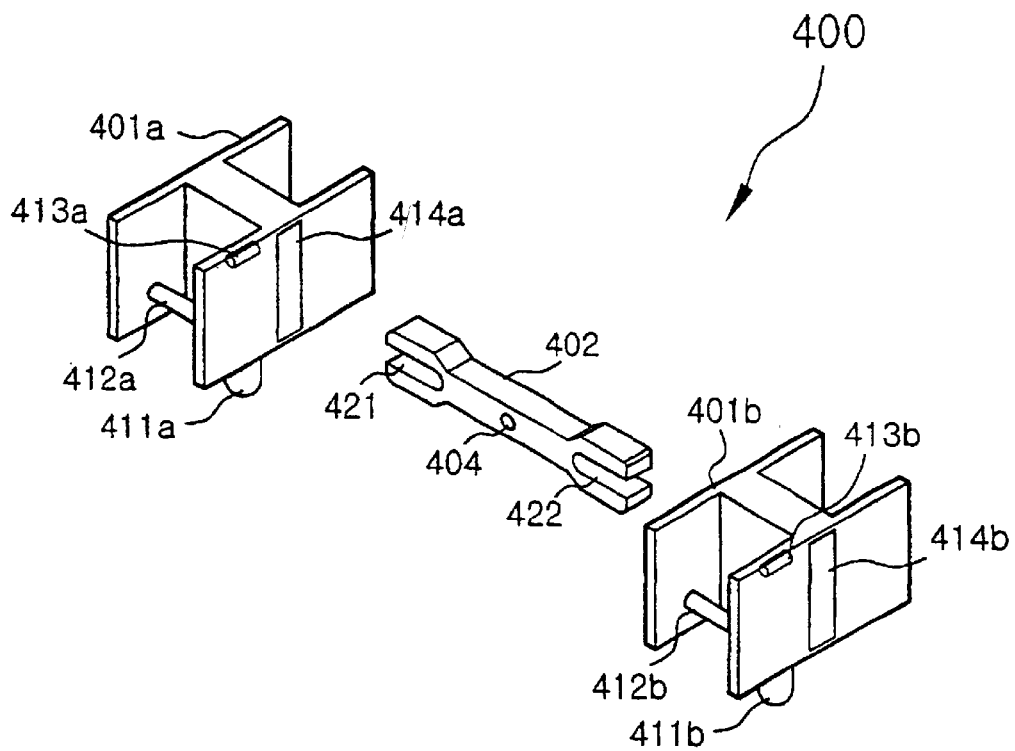
FIG. 8 is a schematic exploded perspective view of a flapping motion part 400 of the compressed air engine.

FIG. 8 is a schematic exploded perspective view of a flapping motion part 400 of the compressed air engine. In the flapping motion part, a pair of reciprocating members 401a and 401b are assembled together through a lever 402. Thus, if the reciprocating member 401a ascends within a shuttle 111a, then the other reciprocating member 401b descends within a shuttle 110b and around a hole 404 and a hole 120 of the engine body 100. During the time when the compressed air engine 1 is in operation, the above actuations are repeatedly carried out.

Thus the lever 402 is secured in such a manner that it can be rotated around a lever support 107 of the engine body. Further, the lever is secured in such a manner that a pin 403 is inserted through the hole 404 of the lever 402 and through the hole 120. Further, the lever has slits 421 and 422 on both ends of it, so that the reciprocating members 401a and 401b can be assembled to the slits 421 and 422.

Figure 9:
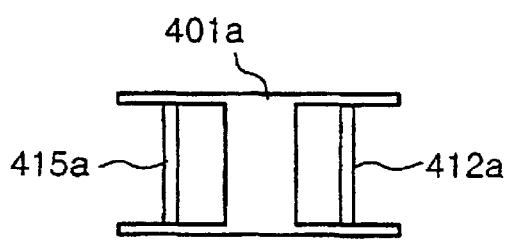
FIG. 9A is a plan view of a reciprocating member 401a, and FIG. 9B is a left side view (or right side view) of it.
Figure 9:
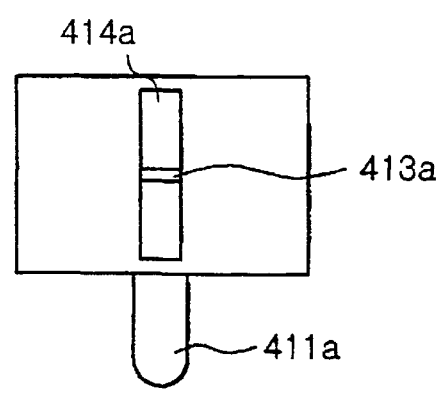

As shown in FIG. 8, a hollow 414b is formed within the reciprocating member 401b, and a pin 413b is formed on the reciprocating member 401b so as to be assembled into the slit 422. On the bottom of the reciprocating member 401, there is formed an extension 411 for being contacted to the top of the piston 300. FIG. 9A is a plan view of the reciprocating member 401a, and FIG. 9B is its left side view (or right side view). Each of the reciprocating members 401 has pins 415 and 412, so that the wings 3 and 4 can be assembled to them.

Figure 10:
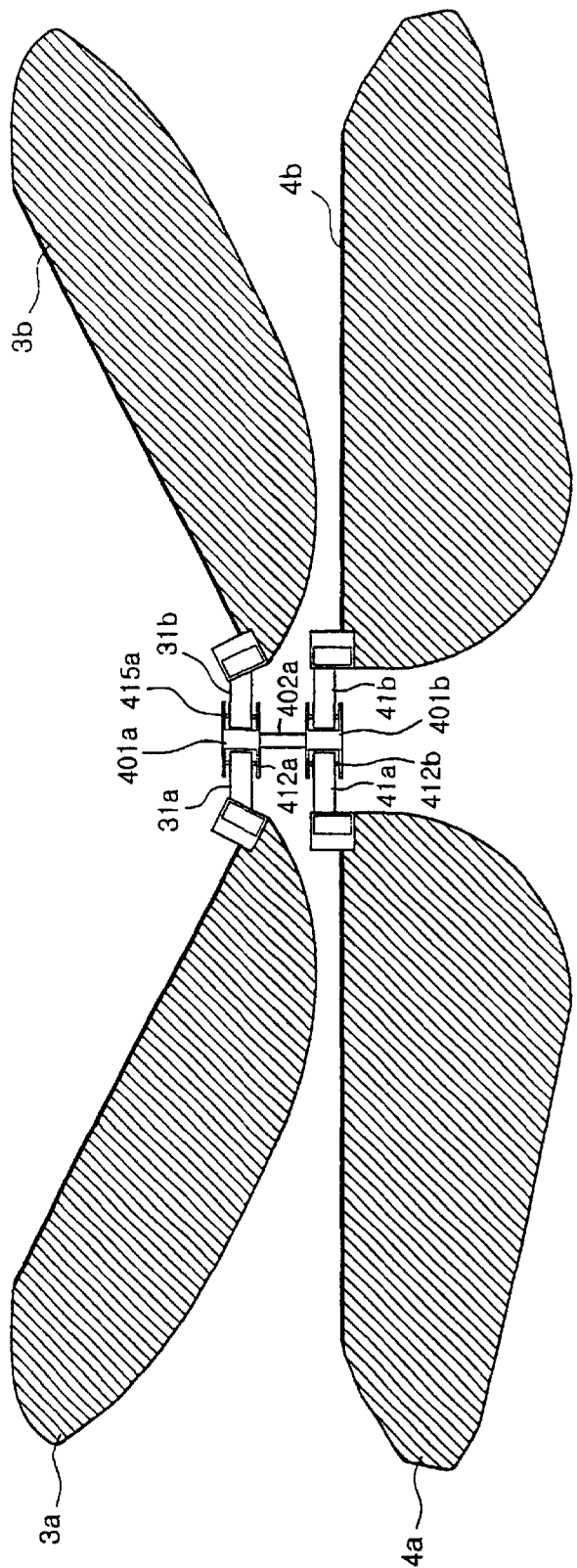
FIG. 10 is a schematic plan view showing the assembling of the two pairs of wings 3a, 3b, 4a and 4b to pins 412a, 415a, 412b and 415b of the flapping motion part 400.

FIG. 10 is a schematic plan view showing the assembling of the two pairs of wings 3a, 3b, 4a and 4b to pins 412a, 415a, 412b and 415b of the flapping motion part 400. The wings 3a, 3b, 4a and 4b are assembled to the pins 412a, 415a, 412b and 415b by means of wing levers 31a, 31b, 41a and 41b.

Figure 11:
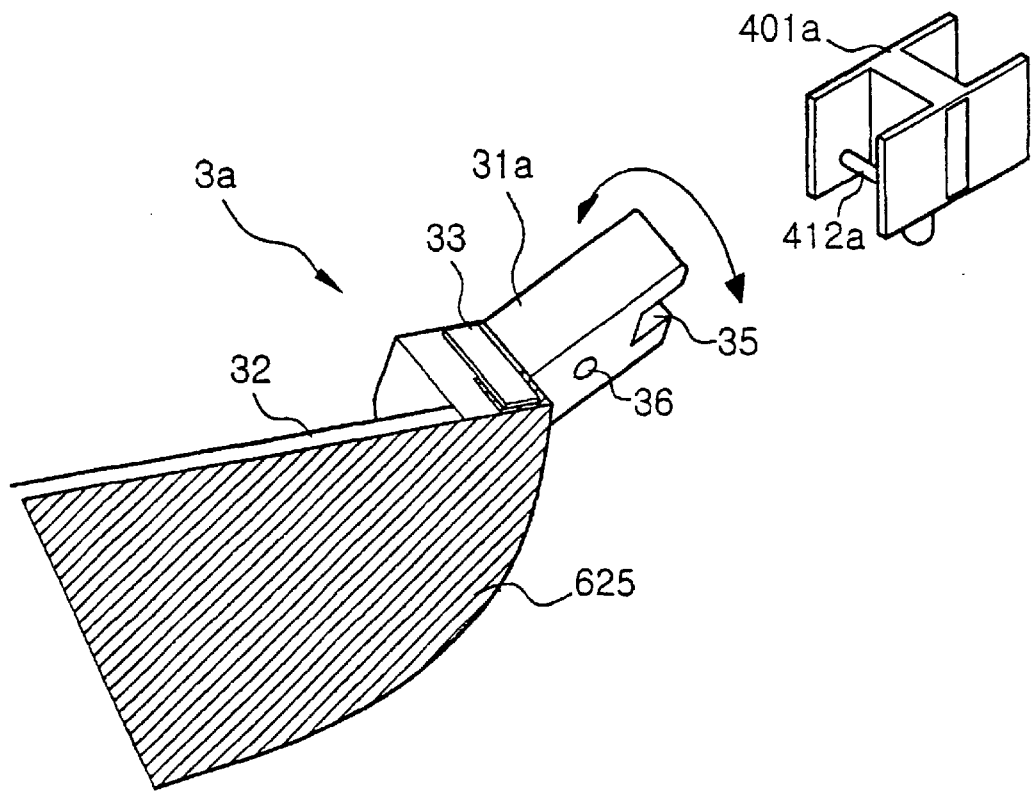
Figure 12:
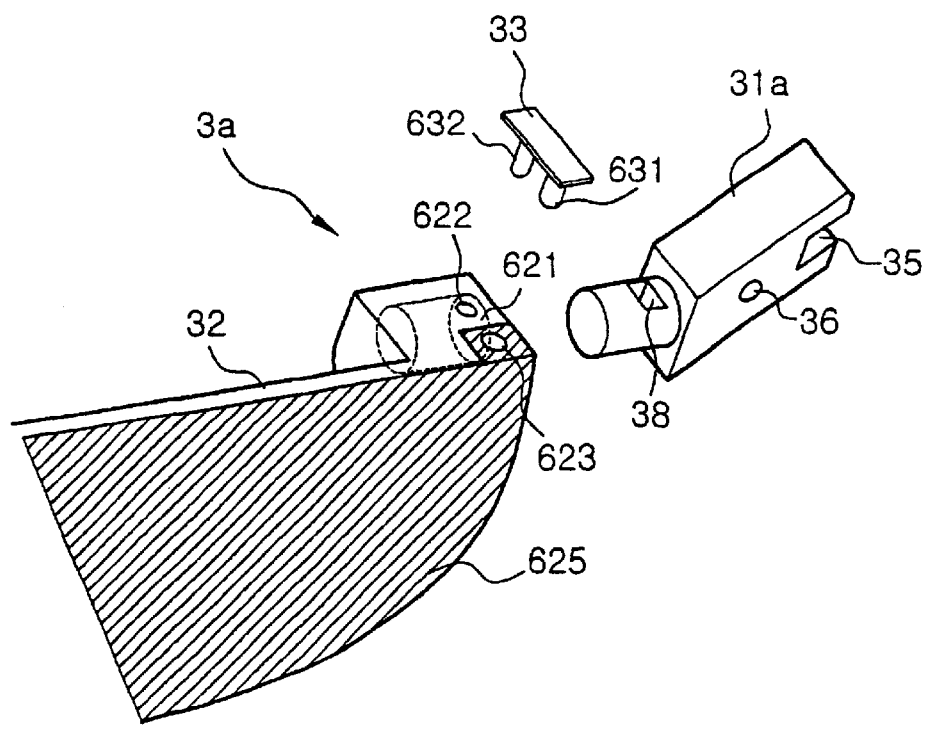

FIG. 11 is a schematic exploded perspective view showing a state in which a front wing 3a is separated from the pin 412a of the reciprocating member 401a. FIG. 12 is a schematic exploded perspective view of the front wing 3a. The front wing is assembled to the pin 412a of the reciprocating member 401a by utilizing the wing lever 31. The wing lever has a slit 35, and the pin 412a is inserted into the slit 35. Then a pin 109a is made to pass through a hole 36 and a protrusion 108a, thereby coupling the wing 3a to the engine body 100.

The wing 3a is secured to the engine body 100 by the pin 109a, and the reciprocating member 401a moves up and down. As a result, the wing 3a performs the flapping motions. The flapping motions of the wing 3a is done within an angular range of about 70°, but those ordinarily skilled in the art will be able to easily change the angular range.

The wing lever 31a is bent by a certain degree, so that the front wing 3a can avoid any contact with the rear wing 4a when performing the flapping motions. Further, when the wing 3a performs the flapping motions, it also performs twisting motions within an angular range of about 15°. The wing 3a is constituted such that a wing cloth 625 is attached on a wing frame 32, and the wing lever 31a is inserted into a hole 621 of the wing frame 32.

Under this condition, the hole 621 has to have to sufficient diameter so that the wing lever 31a can be smoothly rotated.

If the wing lever 31a is inserted, then a clip 33 is inserted into holes 622 and 623, thereby assembling the wing lever 31a. Assembling cocks 631 and 632 of the clip 33 are fixedly secured on the holes 622 and 623 respectively.

However, the rectangular hole 38 of the wing lever 31 has to be larger than the assembling cock 632. In other words, the wing lever has a rectangular hole, so that when the wing 3a is assembled to the wing lever through the clip 33, the wing cloth 625 can perform the twisting motions within a range of about 15° around the axis of the wing frame 32.

Figure 13:
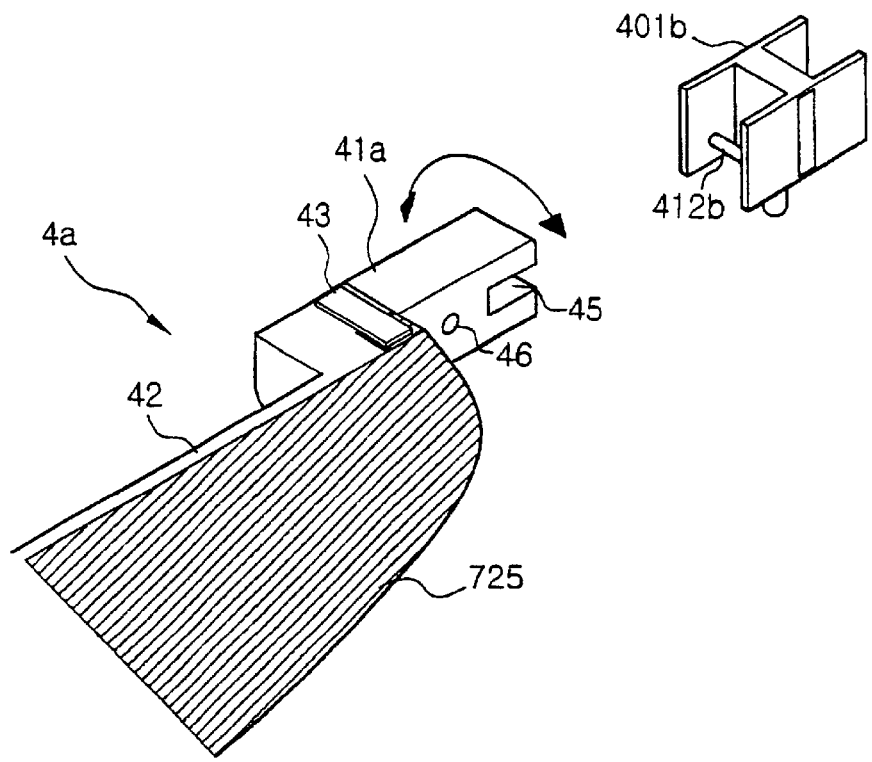
FIG. 13 is a schematic exploded perspective view showing a state in which the rear wing 4a is separated from the pin 412b of the reciprocating member 401b.
Figure 14:
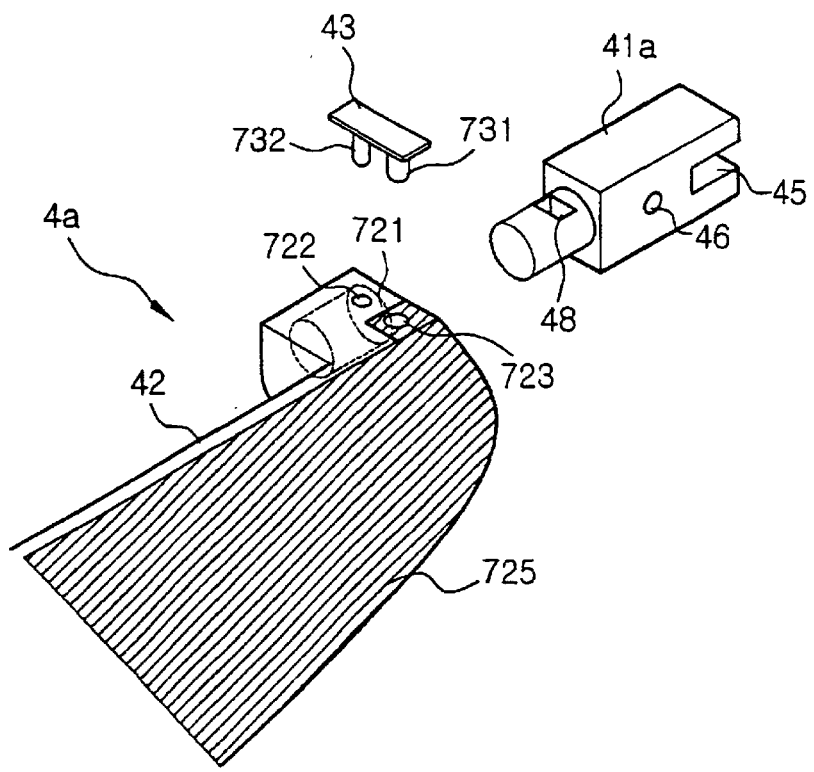

FIG. 13 is a schematic exploded perspective view showing a state in which the rear wing 4a is separated from the pin 412b of the reciprocating member 401b. FIG. 14 is a schematic exploded perspective view of the rear wing 4a. The rear wing is assembled to a pin 412b of the reciprocating member 401b by utilizing a wing lever 41b. The wing lever has a slit 45 in which the pin 412b is inserted.

Then a pin 47 is made to pass through a hole 46 and a protrrsion 108b, thereby coupling the rear wing 4a to the engine body 100. Thus the rear wing 4a is secured to the engine body 100 by the pin 47, and the reciprocating member 401b moves up and down. As a result, the wing 4a performs flapping motions. The angular range of the flapping motions is about 70°, but this range can be easily changed by those ordinarily skilled in the art.

The wing lever 41a of the rear wing 4a has a straight shape unlike the wing lever 31a of the front wing 3a. When the rear wing 4a performs the up/down flapping motions, it also performs twisting motions within an angular range of about 150. The wing 4a is constituted such that a wing cloth 725 is attached on a wing frame 42, and the wing lever 41a is inserted into a hole 721 of the wing frame 42. Under this condition, the hole 721 has to have a sufficient diameter so that the wing lever 41a can be smoothly rotated.

When the wing lever 41a is inserted into the hole 721, the clip 43 is inserted into holes 722 and 723, thereby assembling the wing lever 41a. That is, assembling cocks 731 and 732 are respectively inserted into the holes 722 and 723, and a rectangular hole 48 of the wing lever 41a has to be larger than the assembling cock 732. That is, the rectangular hole 48 of the wing lever 41a is formed such that when the wing 4a is assembled to the wing lever 41a by using the clip 43, the wing cloth 725 can perform twisting motions within an angular range of about 15° around the axis of the wing frame 42.

Figure 15:
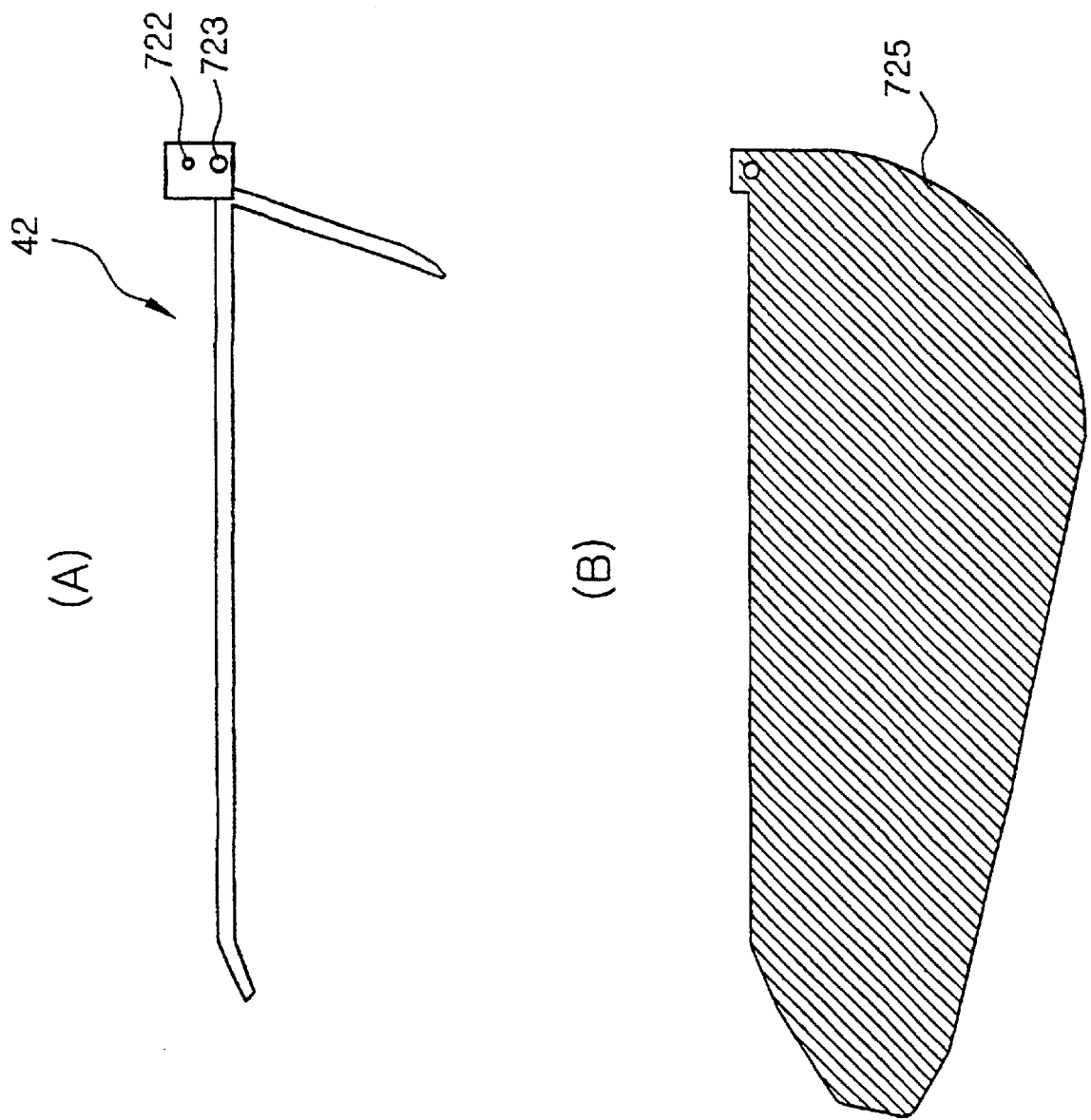

FIG. 15A is a schematic plan view of a frame 42 of the rear wing 4a, and FIG. 15B is a schematic plan view of a wing cloth 725 of the rear wing 4a. The wing 4a is formed by attaching the wing cloth 725 onto the wing frame 42. The wing frame should be preferably made of a synthetic resin, while the wing cloth 725 should be preferably made of a synthetic resin or a fabric. In view of the air resistance, the surface of the wing cloth should be pockmarked, so that the surface area of the wing cloth can be maximized.

Figure 16:
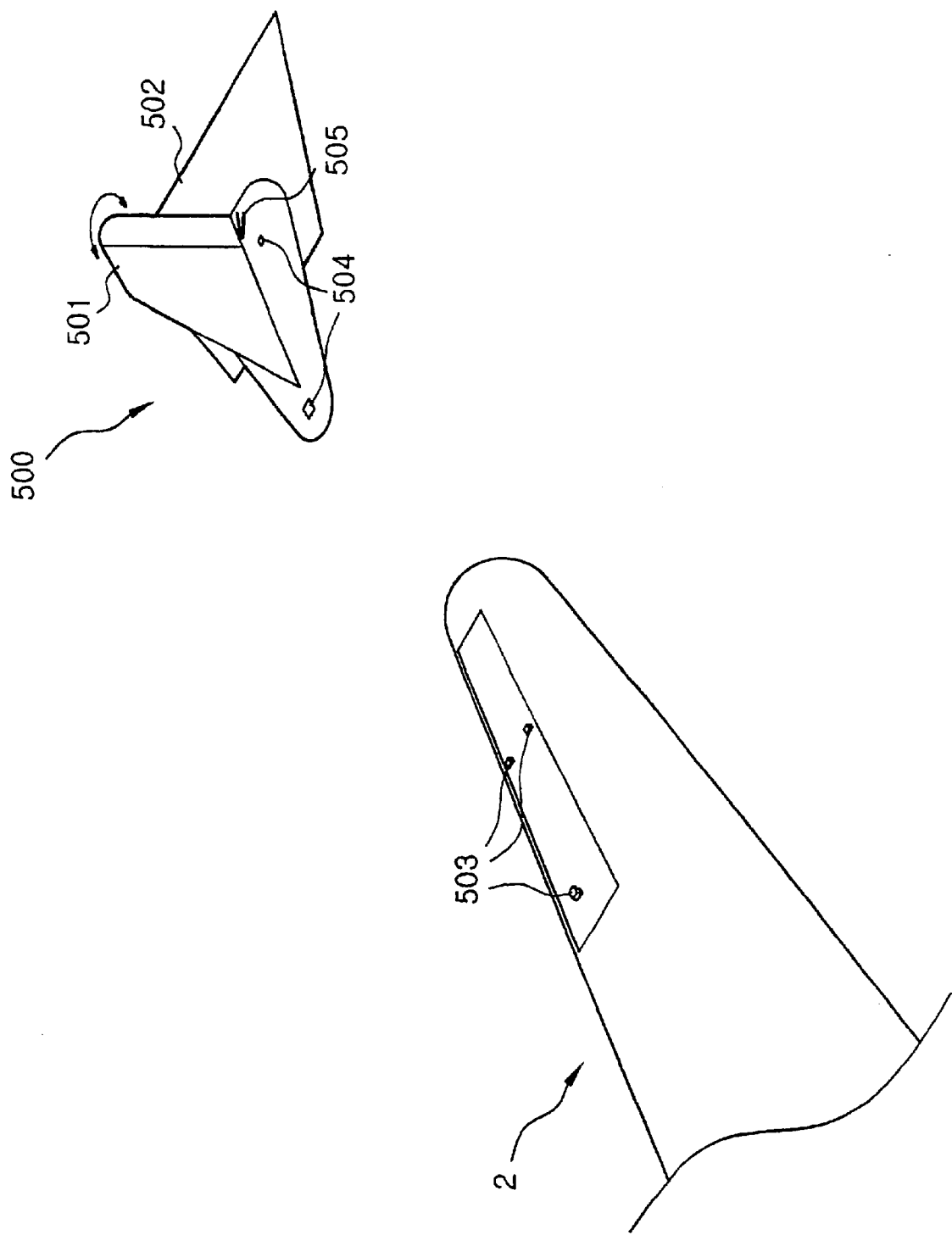
FIG. 16 is a schematic exploded perspective view of a tail wing 500 which is separated from a flybody 2.
Figure 17:
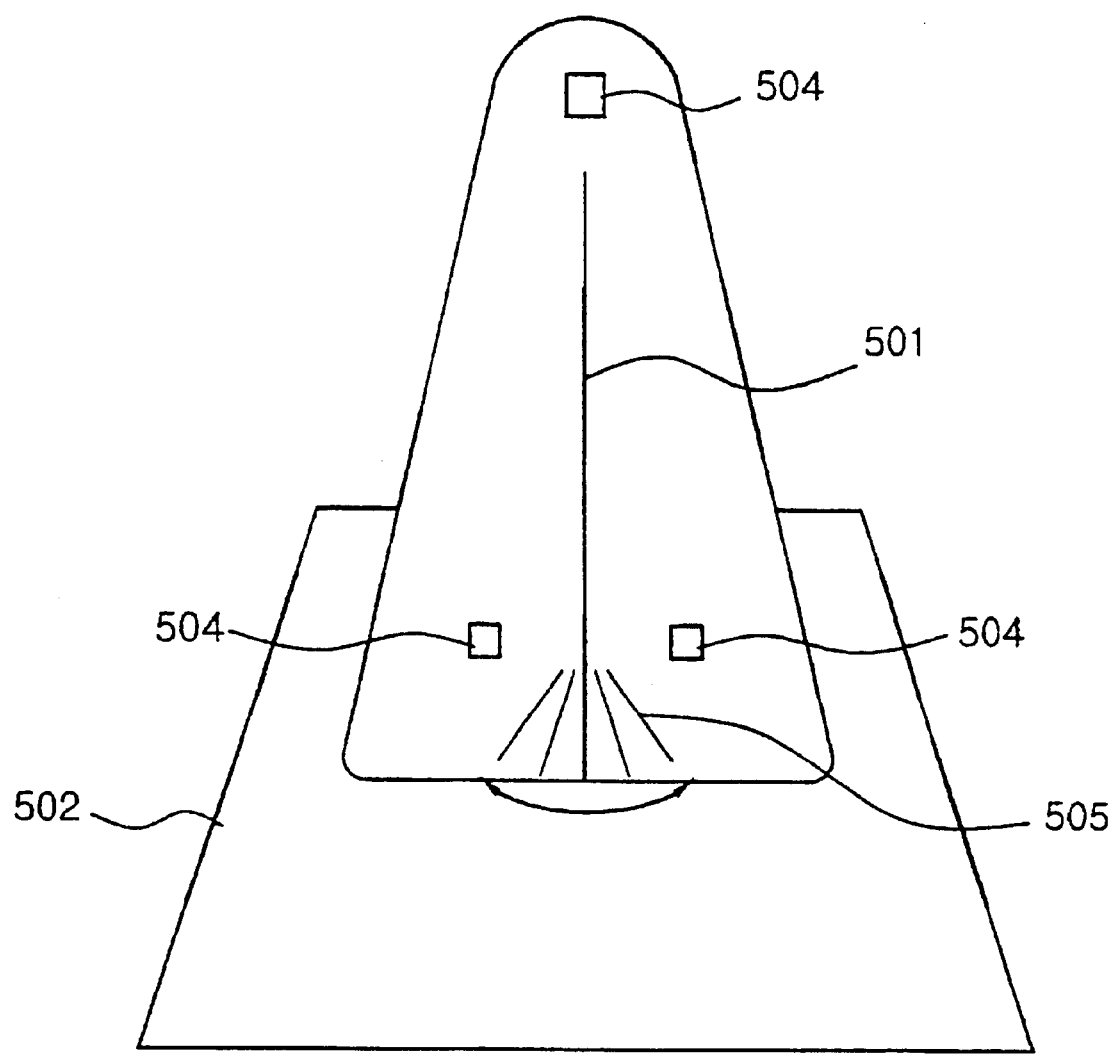
FIG. 17 is a schematic plan view of the tail wing 500.

FIG. 16 is a schematic exploded perspective view of a tail wing 500 which has been separated from a flying body 2, and FIG. 17 is a schematic plan view of the tail wing. The tail wing includes a vertical wing 501 and a horizontal wing 502. Further, the tail wing includes a pair of assembling holes 504, so that the tail wing can be assembled to the flying body. Meanwhile, the flying body has a pair of assembling protrusions 503 to be mated to the assembling holes 504.

On the rear portion of the vertical wing 501, there is formed an adjusting slit 505, so that the direction of the vertical wing can be adjusted. The vertical wing is made of a flexible material, and is installed leaving the adjusting slit, so that the piloting of the flying object can be carried out. For example, if the vertical wing is secured to the right side adjusting slit, then the flying object turns to the right during the flying.

In the above, the present invention was described based on the specific preferred embodiments and the attached drawings, but it should be apparent to those ordinarily skilled in the art that various changes and modifications can be added without departing from the spirit and scope of the present invention, which will be defined in the appended claims.

What is claimed is:

1. A flying object for flying by flapping motions of wings, comprising:
    a compressed air engine;
    a flying body assembled to the compressed air engine and with a compressed air filled therein;
    two pairs of wings symmetrically assembled to left and right sides of the compressed air engine, for performing flapping motions up and down within an angular range of about 70°, a pair of the front wings moving up when a pair of the rear wings move down, and these actuations being repeatedly carried out;
    a head cover for covering a front part and an upper part of the compressed air engine; and
    a tail wing including a vertical wing and a horizontal wing.

2. The flying object as claimed in claim 1, wherein the compressed air engine comprises:
    an engine body 100 comprising: a pair of cylinders 104a and 104b for accommodating a pair of reciprocating pistons 300a and 300b; a pair of shuttles 110a and 110b for accommodating reciprocating motions of a pair of reciprocating members 401a and 401b; and an outlet 101 for assembling the flying body;
    an air injection part 200 assembled to a bottom of the flying body, for injecting the compressed air into the flying body, and for discharging the compressed air from the flying body into the engine body, and comprising: an air injection part body 201, an air injection means 202, and an air exit means 203;
    a pair of pistons 300 for performing up/down movements along the cylinders 104, and each of the pistons 300 comprising: a piston body 301; a disc 303 formed integrally with the piston body; a rubber ring 306 fitted between the piston body and the disc; a spring 305 assembled to a bottom of the disc; a plurality of axially directed grooves 302 formed on the piston and on the disc; and a plurality of through-holes 304 formed in the disc; and
    a flapping motion part 400 with the two pairs of the wings assembled thereon, and comprising: a pair of reciprocating members 401a and 401b, and a lever 402, the lever 402 being assembled to the engine body, and the pair of the reciprocating members 401a and 401b performing up/down movements within the shuttles 110a and 110b in opposite directions.

3. The flying object as claimed in claim 2, wherein the air injection means comprises: a pump connector 222 with an air passage 223 and a dent 224 formed therein; and a rubber bead 221 disposed in the dent.

4. The flying object as claimed in claim 2, wherein the air exit means comprises: an air cock 231 with an air passage 234 and a dent 235 formed therein; a spring 232 inserted into the dent; and a button 233 assembled upon the spring.

5. The flying object as claimed in claim 2, wherein a pair of bead supports 111*a* and 111*b* are formed on a bottom of the engine body, for receiving rubber beads 112*a* and 112*b* respectively.

6. The flying object as claimed in claim 2, wherein the lever has a pair of slits 421 and 422 on both end portions thereof, for receiving the reciprocating members 401*a* and 401*b* respectively.

7. The flying object as claimed in claim 2, wherein the pair of the front wings 3*a* and 3*b* are assembled by fitting the wing levers 31*a* and 31*b* to pins 412*a* and 415*a* of the flapping motion part 400 respectively; and the pair of the rear wings 41*a* and 41*b* are assembled by fitting the wing levers 41*a* and 41*b* to pins 412*b* and 415*b* of the flapping motion part 400 respectively.

8. The flying object as claimed in claim 7, wherein the wing levers 31*a* and 31*b* are bent to a certain degree so as to avoid any contact with the rear wings during the flapping motions.

9. The flying object as claimed in claim 7, wherein the two pairs of the wings 3*a*, 3*b*, 4*a* and 4*b* perform the flapping motions within an angular range of about 70°.

10. The flying object as claimed in claim 7, wherein the wing levers 31 and 41 respectively have rectangular holes 38 and 48, and the rectangular holes 38 and 48 have a size larger than that of assembling cocks 631 and 731 so as to make the two pairs of the wings 3*a*, 3*b*, 4*a* and 4*b* perform twisting motions within an angular range of about 15°.

11. The flying object as claimed in claim 2, wherein each of the wings 3*a*, 3*b*, 4*a* and 4*b* is formed by attaching a wing cloth 625 on a wing frame.

12. The flying object as claimed in claim 1, wherein the wing cloth 625 has a pockmarked surface so as to maximize its surface area.

13. The flying object as claimed in claim 1, wherein the compressed air container (flying body) 2 is inclined by about 12 degrees relative to a horizontal plane of the engine body.

14. The flying object as claimed in claim 1, wherein an adjusting slit 505 is formed so as to make it possible to adjust directions of the vertical wing, and the vertical wing is made of a flexible material.

15. A method for flying a flying object by flapping motions of wings, which comprises:

injecting compressed air into a flying body (compressed air container) to a certain level of pressure by using a portable air pump;

hitting any one of wings upwardly or downwardly to discharge the compressed air from the compressed air container at a certain discharge rate;

driving a compressed air engine with the discharged air; and performing flapping motions by two pairs of wings assembled to the compressed air engine in mutually opposite directions up and down to produce a lifting force and a propulsive force so as to realize a flying.

16. The method as claimed in claim 15, further comprising, during an injection of the compressed air, if the compressed air container exceeds a certain level of pressure, discharging the compressed air through an air exit means to outside.

17. The method as claimed in claim 15 wherein said flapping motions up and down are performed within an angular range of about 70°, and said two pairs of wings perform twisting motions within an angular range of about 15°.

18. The method as claimed in claim 15 wherein the flying direction of the flying object is adjusted by adjusting a posture of a vertical wing of a tail wing.

* * * * *